United States Patent
Perski et al.

(10) Patent No.: US 6,762,752 B2
(45) Date of Patent: Jul. 13, 2004

(54) DUAL FUNCTION INPUT DEVICE AND METHOD

(75) Inventors: Haim Perski, Hod Hasharon (IL); Meir Morag, Tel Aviv (IL)

(73) Assignee: N-trig Ltd., Tel-Aviv (IL)

( * ) Notice: Subject to any disclaimer, the term of this patent is extended or adjusted under 35 U.S.C. 154(b) by 0 days.

(21) Appl. No.: 10/270,373

(22) Filed: Oct. 15, 2002

(65) Prior Publication Data

US 2003/0098858 A1 May 29, 2003

Related U.S. Application Data

(60) Provisional application No. 60/333,770, filed on Nov. 29, 2001.

(51) Int. Cl.[7] ................................................ G09G 5/00
(52) U.S. Cl. ........................................ 345/173; 345/179
(58) Field of Search .............................. 345/173–179; 178/18.01–18.07, 19.01–19.06

(56) References Cited

U.S. PATENT DOCUMENTS

| | | | | |
|---|---|---|---|---|
| 5,231,381 A | * | 7/1993 | Duwaer | 345/174 |
| 5,402,151 A | | 3/1995 | Duwaer | |
| 5,510,813 A | * | 4/1996 | Makinwa et al. | 345/173 |
| 5,543,589 A | * | 8/1996 | Buchana et al. | 178/18.03 |
| 5,670,755 A | * | 9/1997 | Kwon | 178/18.05 |
| 5,777,607 A | * | 7/1998 | Koolen | 345/174 |
| 5,790,106 A | * | 8/1998 | Hirano et al. | 345/173 |
| 6,128,007 A | | 10/2000 | Seybold | |
| 6,239,389 B1 | * | 5/2001 | Allen et al. | 178/18.01 |
| 6,392,636 B1 | * | 5/2002 | Ferrari et al. | 345/173 |
| 6,417,846 B1 | * | 7/2002 | Lee | 345/173 |
| 6,504,530 B1 | * | 1/2003 | Wilson et al. | 345/173 |

\* cited by examiner

Primary Examiner—Bipin Shalwala
Assistant Examiner—Ricardo Osorio
(74) Attorney, Agent, or Firm—G.E. Ehrlich (1995) Ltd.

(57) ABSTRACT

Apparatus for user input to a digital system, comprising a first sensing system for sensing a user interaction of a first type, co-located with a second sensing system for sensing a user interaction of a second type. The first system may detect styluses and like objects using EM radiation and the second system may detect touch pressure.

15 Claims, 11 Drawing Sheets

DUAL FUNCTION INPUT DEVICE AND METHOD

RELATIONSHIP TO EXISTING APPLICATIONS

The present application claims priority from U.S. Provisional Patent Application No. 60/333,770 filed Nov. 29, 2001.

FIELD AND BACKGROUND OF THE INVENTION

The present invention relates to a digitizer and, more particularly, but not exclusively to a digitizer for accepting user input to a computing device.

Input devices typically use one of three most popular technologies, movement tracking, as in a mouse, rollerball and like devices, touch technology as in a touch screen and pointing systems as with a stylus. Different applications may be most suited to certain input technologies or systems.

Touch technologies are commonly used as input devices for a variety of products. The use of touch digitizers is growing rapidly due to the emergence of new mobile devices, such as web pads, web tablets, Tablet—PC, wireless screens and hand-held computers. Such new mobile devices usually come without any integrated keyboard or mouse, due to mobility considerations, and therefore frequently use touch input devices. As well as mobile devices, touch digitizers are useful in computer systems offering services to the general public in shops and the like, where mice are likely to be broken or removed, and are also useful for computers to be used in hazardous environments such as factory floors, since they allow the computer to be suitably sealed.

To date, touch sensitive displays have been implemented using a variety of technologies for detecting touch stimuli. In one example, a transparent overlay is placed over a display. The overlay contains an array of sensors that can be resistive, conductive or capacitive. The sensors are arranged in rows and columns spanning the display screen area; and each sensor is therefore indicative of a particular touch location. Another technology involves the processing of an optical signal scanned across a CRT screen in order to determine a touch location. Yet another technology involves an array of force sensitive transducers that are mounted around the periphery of a display. Each transducer generates a different signal upon receiving a touch stimulus. The relative magnitudes of these signals can then be used to determine a touch location. The major drawback of these technologies and others is that they are all targeted at identifying the location of a single input (e.g. a stylus, a finger). None of these solutions supports multiple inputs simultaneously.

With the emergence of Internet appliances such as Tablet PCs, the need for using a computer keyboard has become evident. Since connecting a standard keyboard to the Tablet PC diminishes the mobility of the device, the requirement to feed these devices with alphanumeric information is usually accomplished by the implementation of an "on-screen" keyboard. An "on-screen" keyboard is a scheme of a computer keyboard graphically illustrated on the display. Inputs are provided by successively touching the relevant graphical keys using a finger or a stylus. However, due to the inherent structure of existing touch technologies, it is impossible to support more than one touch (i.e. one key) at a time. This inherent property makes it impossible to apply the kind of convenient and intuitive keyboard operation known as "chord key", for example "Shift"+"Letter" or "control"+"alt"+"delete", at the same time.

There had been attempts in the past to combine touch sensitive input devices with other kinds of digitizer. U.S. Pat. No. 4,686,332 by Grenians, describes a combination of a capacitance finger sensible sensor with an electromagnetic stylus, both incorporated in the same transparent foil. In Grenians, the same conductors are used for measuring capacitance and for transmitting the electromagnetic signal to the pick-up stylus. However, the device is forced to switch between methods and thereby work at a vastly degraded position report rate. An additional disadvantage of Grenians is the usage of a pick-up stylus, which acts as a receiver and therefore has to be either connected to the host system by wire or alternatively must use an internal battery and transmitter. Both pick-up arrangements are undesirable for mobile systems.

U.S. Pat. No. 5,231,381 to Duwaer describes a combination of two independent sensors, one being sensitive to finger touch and the other being sensitive to stylus position, both incorporated in the same device. Duwaer's device is capable of detecting finger touch and stylus simultaneously. However, the usage of two independent input sensors is a major disadvantage since it usually raises the price of the device. Furthermore, Duwaer's device cannot detect multi finger touch and is therefore unable to support chord-key functionality.

In U.S. patent application Ser. No. 09/628,334 "Physical Object Location Apparatus and Method and a Platform using the same", to Perski et al, an electromagnetic pointing device using a transparent conductive overlay foil is described. The device is capable of detecting the location and identity of physical objects, such as a stylus, located on top of a display. The above electromagnetic technology enables the accurate position detection of one or more electromagnetic pointers, as well as sensing of multiple physical objects, for example playing pieces for use in games. However, the electromagnetic technology is inherently unable to sense a finger touch input, and is therefore inadequate for finger-based operation of an "on-screen" or virtual keyboard. The above-mentioned application is hereby incorporated herein by reference and the reader is referred thereto wherein a method that allows simultaneous detection of different styluses or playing pieces at different positions is described.

In general, finger and stylus interactions require different detection techniques with different resolutions and different update levels. An attempt to use a single detection technique for both finger and stylus interactions is described in U.S. Pat. No. 5,543,589, to Buchana et al, which uses a four layer-two system transparent foil arrangement. Both systems use the same touch detection method but have different resolution levels and update rates so that one can sense stylus type interactions and the other can sense finger touch type interactions. A disadvantage of the system is the higher price of using two sensing systems and that the use of four foil layers markedly reduces visibility of the underlying screen when used over a display. An additional disadvantage of Buchana's system follows from the use of two similar sensing systems. Full mouse emulation, as an example, requires the tracking of the stylus position while hovering above the display. Such a feature cannot be supported by a pressure sensitive system, which is on the other hand essential for finger touch detection.

There is thus a widely recognized need for, and it would be highly advantageous to have, a digitizer devoid of the above limitations.

SUMMARY OF THE INVENTION

According to one aspect of the present invention there is provided apparatus for user input to a digital system, comprising a first sensing system having first sensors for sensing a user interaction using a sensing method of a first type, and a second sensing system having second sensors for sensing a user interaction using a sensing method of a second type, said first and second sensors being co-located on a sensing surface.

Preferably, said first and said second sensing systems respectively are operable to sense simultaneously.

Preferably, said sensing surface is superimposed on a display screen.

Preferably, said sensing surface is superimposed on a part of said display screen.

Preferably, a first of said sensing systems is superimposed on a part of said display screen, and a second of said sensing systems is superimposed substantially over an entirety of said display screen.

Preferably, each one of said sensing systems is superimposed on a respectively independently defined part of said display screen.

Preferably, said first sensing system is a touch pressure-sensing system.

Preferably, said second sensing system is an electromagnetic based sensing system.

Preferably, said display screen is a flat panel screen.

Preferably, at least one of said sensing systems comprises sensor reading operability for reading multiple simultaneous interactions with respective sensors.

Preferably, said display screen is an LCD screen

The apparatus preferably comprises a connectivity interface for allowing fitting as an accessory to a computing system.

Preferably, said display screen is an electronic pad-type surface.

Preferably, said co-located sensing systems are constructed as a foil-based sensing arrangement.

Preferably, said foil-based sensing arrangement comprises at least one transparent foil.

Preferably, at least some of said sensors comprise organic conductive material.

Preferably, said transparent foil is a patterned transparent foil.

Preferably, said pattern is etched onto said foil, thereby to form said sensors.

Preferably, said pattern is printed on said foil, thereby to form said sensors.

Preferably, said pattern is introduced by passivation.

Preferably, said foil-based sensing arrangement comprises at least two superimposed transparent foils.

Preferably, sensors of said first sensing system are embedded in each of said at least two superimposed transparent foils.

Preferably, sensors of said second sensing system are embedded in each of said at least two superimposed transparent foils.

Preferably, sensors of said second sensing system are embedded in each of said at least two superimposed transparent foils.

Preferably, sensors of said first and said second sensing systems respectively are interleaved in said foil-based sensing arrangement.

Preferably, sensors of said first and said second sensing systems are interleaved in said first of said at least two superimposed transparent foils.

Preferably, said first and said second sensing systems have respectively different report rates for scanning respective sensors.

Preferably, said respectively different report rates are selected for compatibility with a respective one of said first and second user interaction type.

Preferably, said first and said second sensing systems have respectively different sensing resolution levels.

Preferably, said respectively different sensing resolution levels are selected for compatibility with a respective one of said first and second user interaction type.

Preferably, said first sensing system is an electromagnetic based sensing system, said respective user interaction is stylus operation and said respective resolution level is selected for compatibility with a respective application.

Preferably, said second sensing system is a pressure based sensing system, said respective user interaction is touch and said respective resolution level is selected for fingertip size.

Preferably, said foil-based sensing arrangement comprises two superimposed transparent foils, and wherein a first parallel arrangement of pressure-sensitive sensors is located on a first of said foils and a second parallel arrangement of pressure-sensitive sensors, orthogonal to said first parallel arrangement, is correspondingly located on a second of said foils.

Preferably, said superimposed foils are spaced apart by a flexible spacer to be pressed together upon application of pressure.

Preferably, said flexible spacer comprises a matrix of substantially non-conducting material with gaps, wherein said gaps are located to correspond to junctions between said first and second parallel arrangements of pressure-sensitive sensors, such that upon application of pressure at any given junction, corresponding sensors are brought into contact.

Preferably, said substantially non-conducting material is located to separate between sensors of said first sensing system.

Preferably, said flexible spacer comprises spacer dots, said spacer dots being concentrated about sensors of said first sensing system.

Preferably, said flexible spacer is printed onto at least one of said foils.

Preferably, each sensing system has a set of sensors located within said foil-based sensing arrangement, and wherein each set of sensors is arranged substantially as a grid.

Preferably, each sensing system has an arrangement of sensors set out to define detection co-ordinates and at least one of said sensing systems comprises scanning control functionality for scanning said detection co-ordinates in a multi-stage scanning operation, thereby to home in on multiple locations.

Preferably, said arrangement is a grid and said co-ordinates are Cartesian co-ordinates.

Preferably, said multi-stage scanning operation comprises a first stage of scanning groups of sensors along each axis of said grid, and a second stage of homing in on co-ordinates indicated in said first stage.

Preferably, said first stage comprises applying a sensing signal to all sensors of each group in a first axis, and reading each sensor in said second axis, and then applying a sensing signal to all sensors of each group in said second axis and reading each sensor in said first axis.

Preferably, said scanning control functionality is operable to determine whether an ambiguity is present, and, if an ambiguity is present to define suspect sensors as any sensor giving rise to a signal.

Preferably, said scanning control functionality is further operable to select each suspect sensor one at a time in a first of said axes, to apply a sensing signal thereto, and to read each suspect sensor in a second of said axes.

According to a second aspect of the present invention there is provided a pressure sensing apparatus for detection of at least two pressure locations, the apparatus comprising:

an arrangement of pressure sensors set out to define detection co-ordinates, and scanning control functionality for scanning said detection co-ordinates in a multi-stage scanning operation, thereby to home in on said at least two pressure locations.

According to a third aspect of the present invention there is provided a sensor arrangement for superimposing over a visual display screen, comprising:

a first transparent foil having sensors of a first detection system for detecting a user interaction of a first type, and sensors of a second detection system for detecting a user interaction of a second type, embedded therein, and a second transparent foil superimposed over said first transparent foil and flexibly spaced therefrom, having further sensors of said first detection system and of said second detection system embedded therein.

According to a further aspect of the present invention there is provided a pressure sensing arrangement for superimposing over a visual display screen, comprising:

a first transparent foil having a first set of parallel pressure sensors, a second transparent foil, superimposed over said first transparent foil having a second set of parallel pressure sensors, said transparent foils being orientated such that said first and second sets of transparent foils are respectively orthogonal, a substantially non-conductive spacer located between said first transparent foil and said second transparent foil to separate between said foils, said spacer being flexible to allow contact between pressure sensors on respective foils about a point of application of pressure, thereby to transfer a signal between contacted pressure sensors, and a scanning controller for controlling a scanning operation to apply signals to said sensors and to read outputs in such a way as to provide unambiguous pressure information concerning every junction on a grid defined by said pressure sensors.

Preferably, said scanning operation comprises two stages, a first stage of scanning groups of sensors on each foil, and a second stage of homing in on junctions indicated in said first stage, thereby to detect simultaneous applications of pressure at multiple points.

Preferably, each scanning operation is an exhaustive scanning operation comprising individual testing of each junction.

Preferably, said first stage comprises outputting a signal to each sensor on one of said foils and detecting at each sensor on the other of said foils, then outputting a signal to each sensor on said other foil and detecting at each sensor on said one of said foils.

Preferably, said second stage comprises outputting a signal to each sensor, on one of said foils, that has been indicated in said first stage, and detecting at each sensor that has been indicated in said first stage on the other of said foils.

Preferably, said scanning controller is operable to carry out each of said two stages at substantially twice the frequency of fastest likely changes in a pressure application pattern.

According to a fourth aspect of the present invention there is provided a method of sensing of a plurality of pressure sensitive points arranged in a grid for detection of simultaneous applications of pressure at a plurality of said points, the method comprising testing said grid such as to obtain an unambiguous pressure detection result for each of said pressure points in said grid.

Preferably, said testing comprises:

outputting a signal to each of a plurality of sensors on one axis of said grid, detecting at each of a plurality of sensors on a second axis of said grid, outputting a signal to each of said plurality of sensors on said second axis of said grid, detecting at each of said plurality of sensors on said first axis of said grid, from said detecting deducing sensors that are possible sources of ambiguity, and conducting further outputting and detecting to resolve said ambiguity.

Preferably, said conducting further outputting comprises selecting one of said axes and outputting a signal to each of said possible sources of ambiguity thereon, and said detection comprises detecting at each of said possible sources on the other of said axes for each said outputting.

Preferably, said testing comprises an exhaustive test of each of said pressure points individually.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing selected tasks or steps manually, automatically, or a combination thereof. Moreover, according to actual instrumentation and equipment of preferred embodiments of the method and system of the present invention, whilst part of the invention requires hardware, certain selected steps may be implemented by hardware or by software on any operating system or any firmware or a combination thereof. For example, as hardware, selected steps of the invention may be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
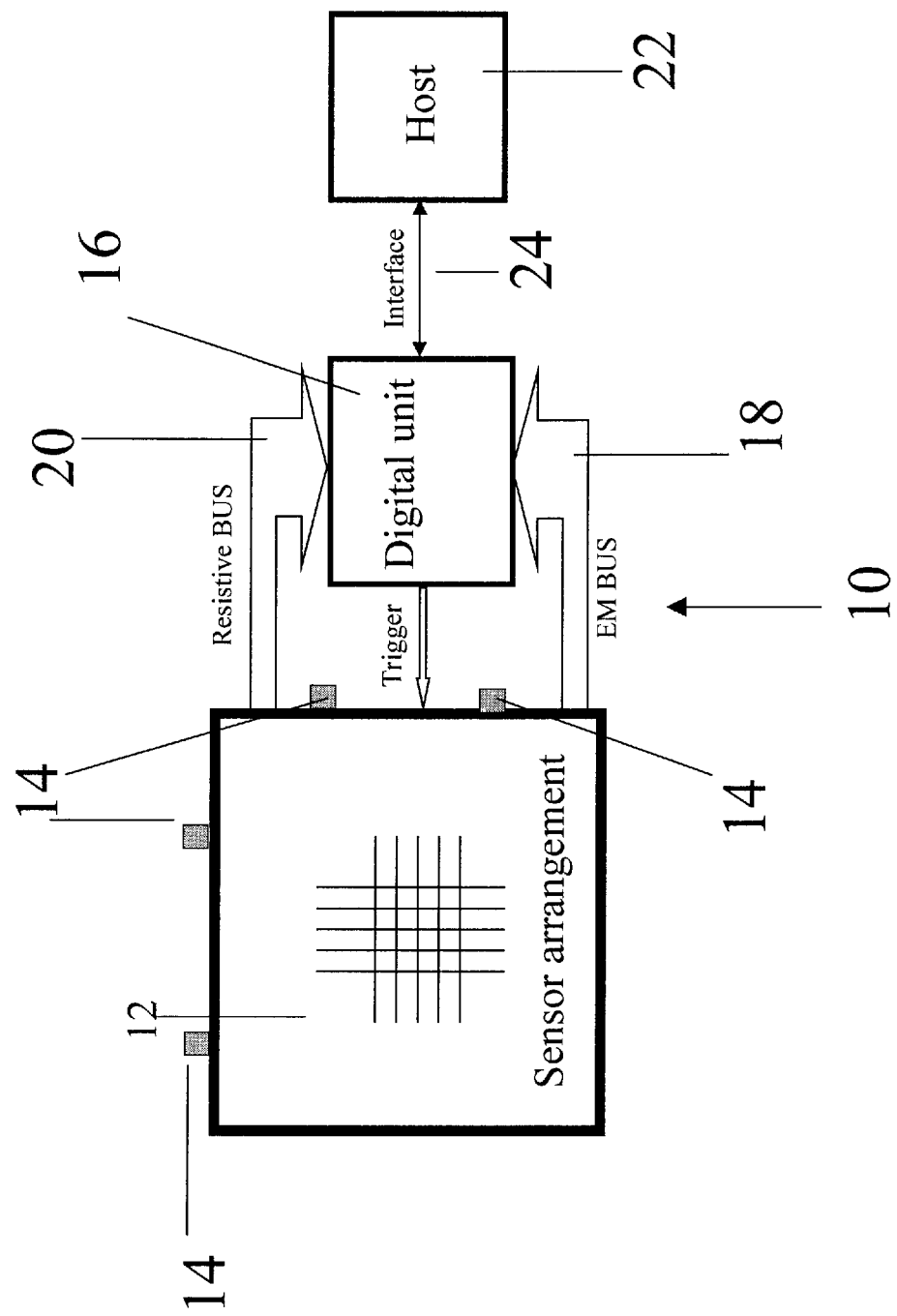
FIG. 1 is a simplified block diagram of a dual technology sensor according to a first preferred embodiment of the present invention.

The present embodiments disclose a patterned transparent conductive foil system, able to detect the location and if relevant, identity, of physical objects, and further to enable finger inputs directly on the display. The primary use of the embodiments is to allow both stylus operation and the natural and intuitive finger operation of an "on-screen" or virtual keyboard. The embodiments are particularly useful for incorporation into mobile devices since they provide a single digitiser system. However they are useful as an intuitive and flexible data entry or user interaction system in any circumstances where users need to interact with a computer system.

The present embodiments also disclose a touch screen able to sense multiple simultaneous touches, and thus to support so-called chord key operations.

The embodiments may thus be used to support virtual keyboards in such a way as to overcome the disadvantages of the above-described prior art technologies. The embodiments combine electromagnetic and touch-sensitive technologies in a single transparent foil system. In addition, the preferred embodiments enable the detection of more than a single touch input at the same time, thereby enabling chord key operation.

More specifically, embodiments of the present invention provide a new type of a flat panel display digitizer supporting both the detection, using electromagnetism, of physical objects, such as a stylus, and the detection of finger touch operations using a single transparent overlay foil system.

Embodiments may be provided as a built in part of a computing system or as an add-on accessory.

The principles and operation of a digitizer according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Reference is now made to FIG. 1, which is a simplified block diagram showing an integrated technology digitizer according to a first preferred embodiment of the present invention. Digitizer 10, for incorporation into for example a mobile computing device, comprises a transparent sensing arrangement 12, which combines electromagnetic and touch sensitive transparent conductors. The sensor arrangement 12 is typically located over an LCD or other kinds of computer display. Front-end ASICs 14, preferably mounted on the frame of the sensor, process and sample signals output by the electromagnetic sensor conductors. The sampled signals are preferably forwarded to digital processing unit 16 through data bus 18 dedicated to the electromagnetic subsystem and hereafter referred to as an electromagnetic (EM) bus 18. A resistive bus 20 transfers touch signals between the digital unit 16 and the touch sensors. In the case of touch signals, signal transfer along the bus is bi-directional, as will be explained in greater detail below.

The digital unit 16 preferably processes both electromagnetic and touch-sensitive signals. As will be explained in greater detail below, the outcome of processing is a series of positions of electromagnetically located and/or identified objects, for example one or more styluses, and the positions of one or more fingers that touch the sensor. The digital processor output is preferably forwarded to host computing device 22 via interface 24. In a preferred embodiment the digital unit communicates with the host via a simple serial interface. Additional interfaces, such as USB, may also be used.

Figure 2:
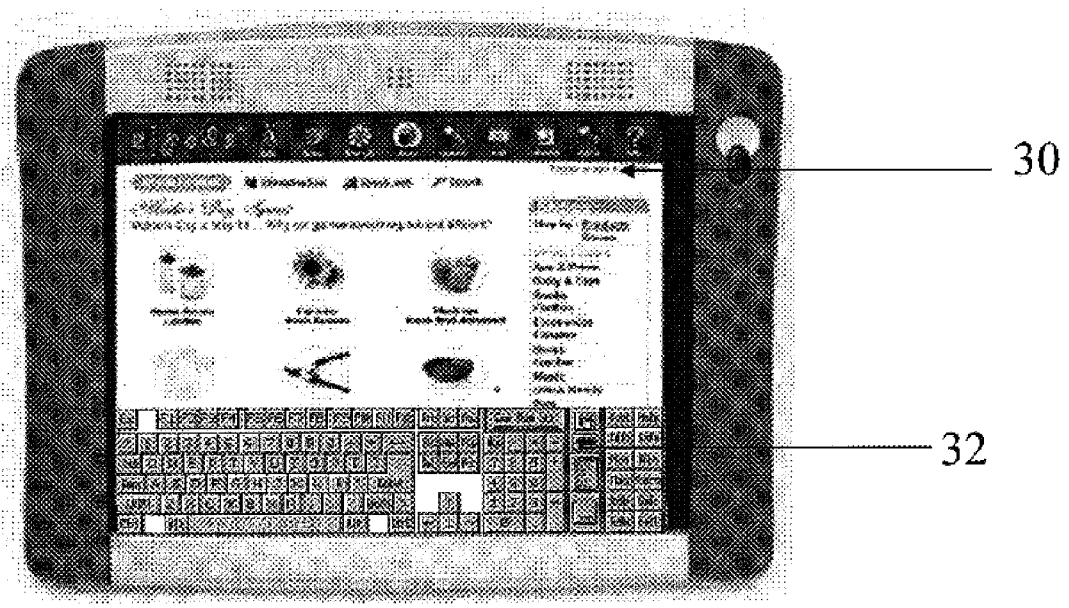
FIG. 2 is a screen display showing a virtual keyboard.

The host computer preferably interprets stylus position and mode as mouse inputs. Reference is now made to FIG. 2 which is a simplified screen illustration showing a typical display 30 on a mobile computing device that uses a virtual keyboard. A virtual keyboard 32 of the kind that may typically be provided on a host screen display is shown. The virtual keyboard comprises illustrations of standard keyboard keys arranged in a standard keyboard layout. The user is able to touch the screen at a point corresponding to a key in the display, using either a finger or a pointing device such as a stylus, and the detected locations are interpreted as the corresponding keyboard inputs.

In a preferred embodiment of the present invention, touch detection is extended only to the lower part of the screen, in which the keyboard is likely to be located, whereas stylus sensing extends to the entire screen. Such an embodiment leads to a reduction in the number of parts, and thus reduced cost coupled with greater reliability. The skilled person will appreciate that other arrangements are possible, including having each sensing system restricted to only part of the screen.

In U.S. patent application Ser. No. 09/628,334 an electromagnetic based sensing device is described which is capable of detecting physical objects, such as styluses, located on top of a flat panel display. An embodiment disclosed therein comprises a system built of two transparent foils, preferably patterned with organic conductive lines, one containing a set of vertical conductors and the other a set of horizontal conductors. The physical object contains a resonance circuit, which is energized by an excitation coil that surrounds the two sets of foils. A trigger signal for energizing is preferably provided by a signal generator at preset intervals. The exact position of the physical object is determined by processing signals issued by the physical object as a result of being thus energized. The signals as issued are sensed by the grid of horizontal and vertical conductors. Sensing resolution is higher than the grid size since signal processing allows for interpolation between the surrounding sensors.

As with the above application, in a preferred embodiment of the present invention, oscillations of the electromagnetic signals, transmitted by the resonance circuit of the physical objects, may be sensed by a two dimensional matrix of conductors. The conductive lines are patterned on a transparent foil, separated by nonconductive areas between the lines. However, in embodiments of the present invention, conductive stripes (alternatively called pressure stripes) are patterned between the electromagnetic conductors on each of the foils. These conductive stripes are used for sensing the touch pressure. The conductive lines and pressure stripes are preferably made of organic conductive materials.

The conductive lines may be formed by etching from a uniform conductive layer or may be printed onto the foil. As a further alternative a layer of conductive material is provided and then, where conduction is not required, a passivation process is provided.

Figure 3:
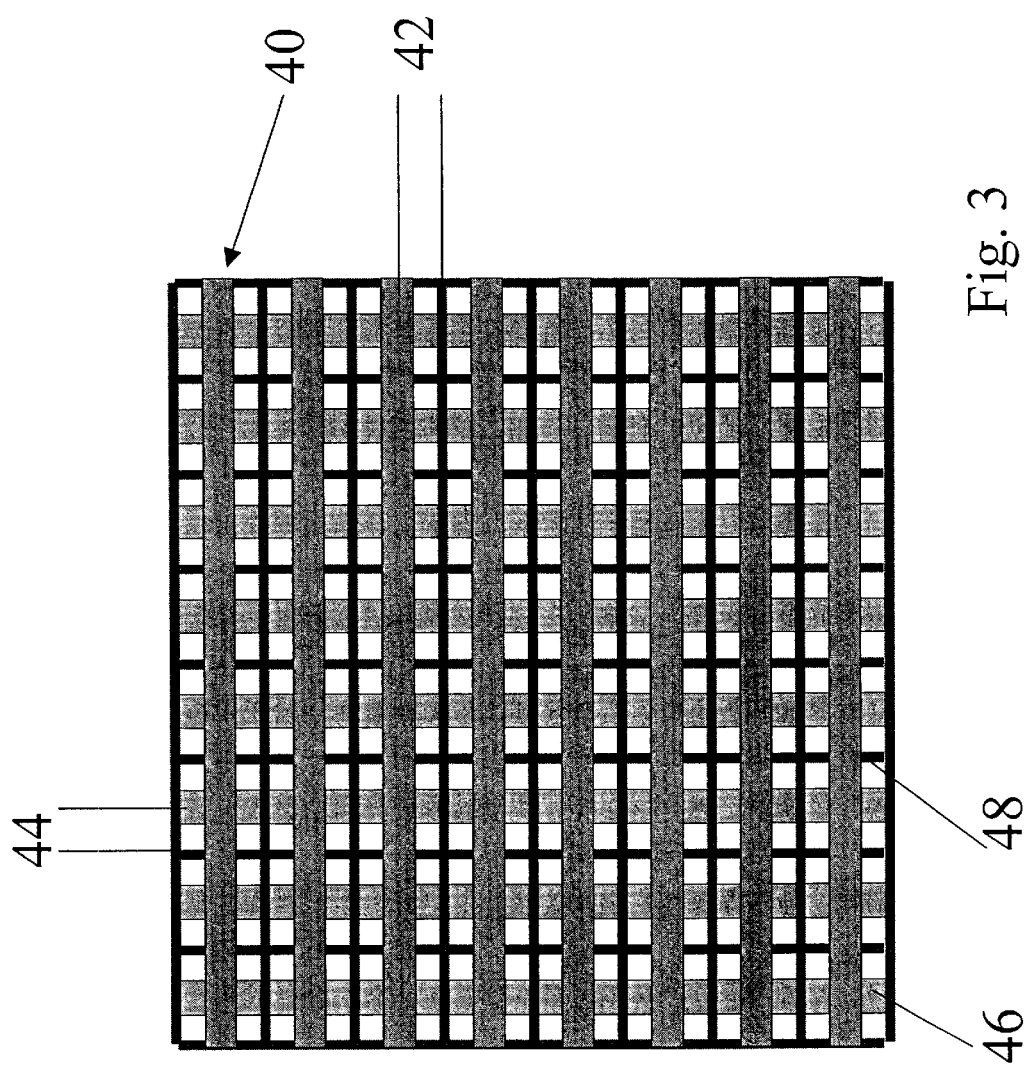
FIG. 3 is a schematic diagram showing conductors laid out in a two-layer sensing arrangement according to a preferred embodiment of the present invention.

Reference is now made to FIG. 3, which is a schematic diagram showing conductors laid out on a two-layer sensing arrangement according to a preferred embodiment of the present invention. The arrangement used in FIG. 3 is known as a resistive matrix. Arrangement 40 is preferably formed of a two-dimensional grid of transparent conductors. The arrangement preferably comprises two foil layers, a first foil layer containing a first set of parallel conductive lines 42, and a second foil layer containing a second set of parallel conductive lines 44. The foils are preferably arranged so that the second set of parallel conductive lines are substantially orthogonal to the first set.

In a preferred embodiment, touch sensitive wide conductive stripes 46 are patterned between EM sensitive narrow conductive lines 48 in each of the first and second layers. It is noted that the touch sensitive stripes are not necessarily wide. In another preferred embodiment they are the same width as the conductive lines. The spacing between the conductive stripes is preferably selected to be suitable for the resolution level to which it is necessary to detect fingers. The EM sensitive narrow lines detect electromagnetic emissions from the stylus and have a resolution level which depends on the level of signal processing. Preferably the resolution level is higher than that of the conductive stripes and is preferably selected for the requirements of the relevant applications. The higher resolution may be achieved by carrying out interpolations between the signals received at surrounding sensor lines.

Figure 4:
FIG. 4 is a simplified diagram showing an enlargement of one of the foils of the arrangement of FIG. 3.

Reference is now made to FIG. 4, which is a simplified diagram showing an enlargement of one of the foils of the arrangement of FIG. 3. The layer comprises parallel conductors in one of the orientations, that is to say vertical or horizontal, of the grid. Touch sensitive wide conductive stripes 50 and 52, used for sensing touch pressure, are patterned between conductive lines 54, 56 and 58 that are used as electromagnetic antennas. In this manner, conductive stripes are patterned in between pairs of conductive lines on each of two foils. The two foils are then superimposed to form a two dimensional grid comprising horizontal stripes located on one transparent foil, and vertical stripes located on the other transparent foil.

Figure 5:
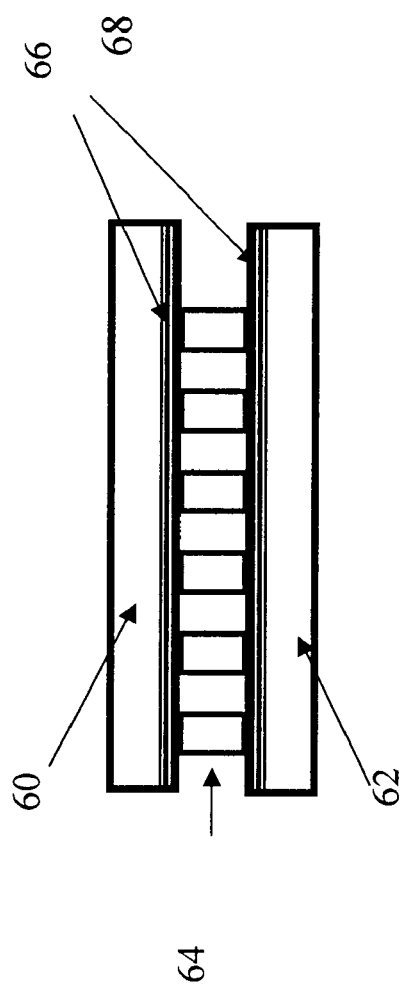
FIG. 5 is a simplified vertical cross-sectional diagram showing two foils superimposed upon each one another and separated by spacers, in accordance with a preferred embodiment of the present invention.

Reference is now made to FIG. 5, which is a simplified vertical cross-sectional diagram showing two foils superimposed upon one another and separated by spacers, in accordance with a preferred embodiment of the present invention.

Two foils, 60 and 62, respectively contain horizontal sensor patterns and vertical sensor patterns. The foils are assembled one on top of the other, and are separated by a non-conductive separation layer 64. Each foil has a conductive surface, 66 and 68 respectively. The foils are arranged so that the conductive side of each foil faces the other foil.

Figure 6:
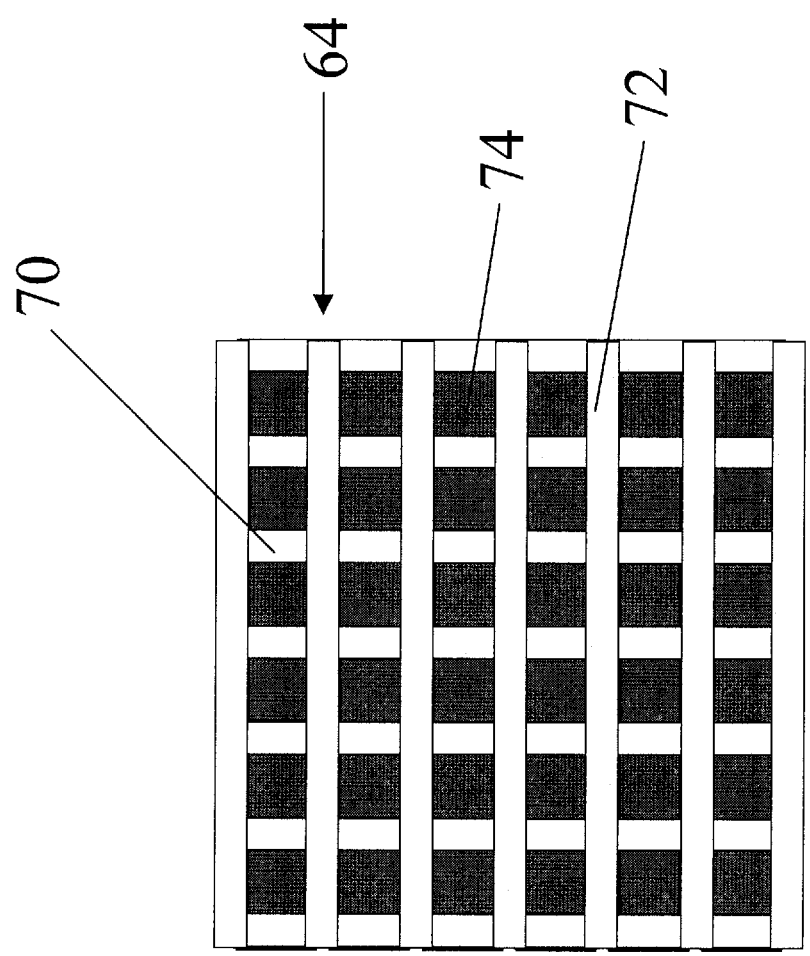
FIG. 6 is a simplified diagram showing a view from above of a separation layer for placing between the foils.

Reference is now made to FIG. 6, which is a simplified diagram showing a view from above of the separation layer 64. The separation layer 64 which, as described above, is placed between the foils, preferably comprises a two dimensional matrix of non-conductive separation lines, vertical 70 and horizontal 72, configured to match the pattern of the electromagnetic conductors. The matrix preferably comprises air gaps 74 located between the non-conductive separation lines. The separation layer 64 avoids short circuits within the sensor by preventing the electromagnetic lines from touching each other or touching any of the pressure sensitive stripes on the opposite foil and by normally preventing the pressure sensitive stripes on the respective foils from touching each other.

In addition, the matrix is of resilient material. The separation layer 64 enables pressure sensing by creating a physical gap between the vertical and the horizontal conductive stripes, thus preventing the stripes from touching each other when no pressure is applied, as mentioned above. However application of pressure squeezes the matrix, causing the stripes of the upper and lower layers to be brought into contact in the region of the air gaps 74. At the same time, no contact is brought about between adjacent electromagnetic lines since the separation lines of the matrix provide a non-conducting separation therebetween, which is retained even upon application of pressure.

Patterning on the separation layer 64 preferably substantially matches the pattern of the electromagnetic conductors, with a certain amount of additional margin. The separation layer may thus comprise squares or rectangles of non-conductive mask. The mask is preferably printed onto the foil layers, using transparent non-conductive adhesive, as part of the sensor production process. As an alternative it may be etched from a layer of non-conductive material applied to the foil. Apart from transparent non-conductive adhesive, other transparent or semi-transparent nonconductive materials may also be suitable, transparency and semi-transparency being considered relative to the layer thicknesses used in the foil. Furthermore, as the electromagnetic conductors are particularly thin, it may be possible to make a mask of opaque materials without interfering with viewing of the screen, and such an embodiment may be particularly suitable for certain industrial applications such as CNC devices where minor interference with vision is not critical.

In an alternative embodiment of the present invention the separation layer 64 comprises a mask of spacer dots. A high density of such spacer dots is placed in the regions of the electromagnetic conductors, preventing them from touching each other or touching the pressure sensitive stripe. A lower density of dots is placed in the regions of junctions between the pressure sensitive stripes, sufficient to prevent the stripes from touching each other when no pressure is applied but enabling easy contact upon touch pressure. In another preferred embodiment no dots are provided over the junction regions.

Figure 7:
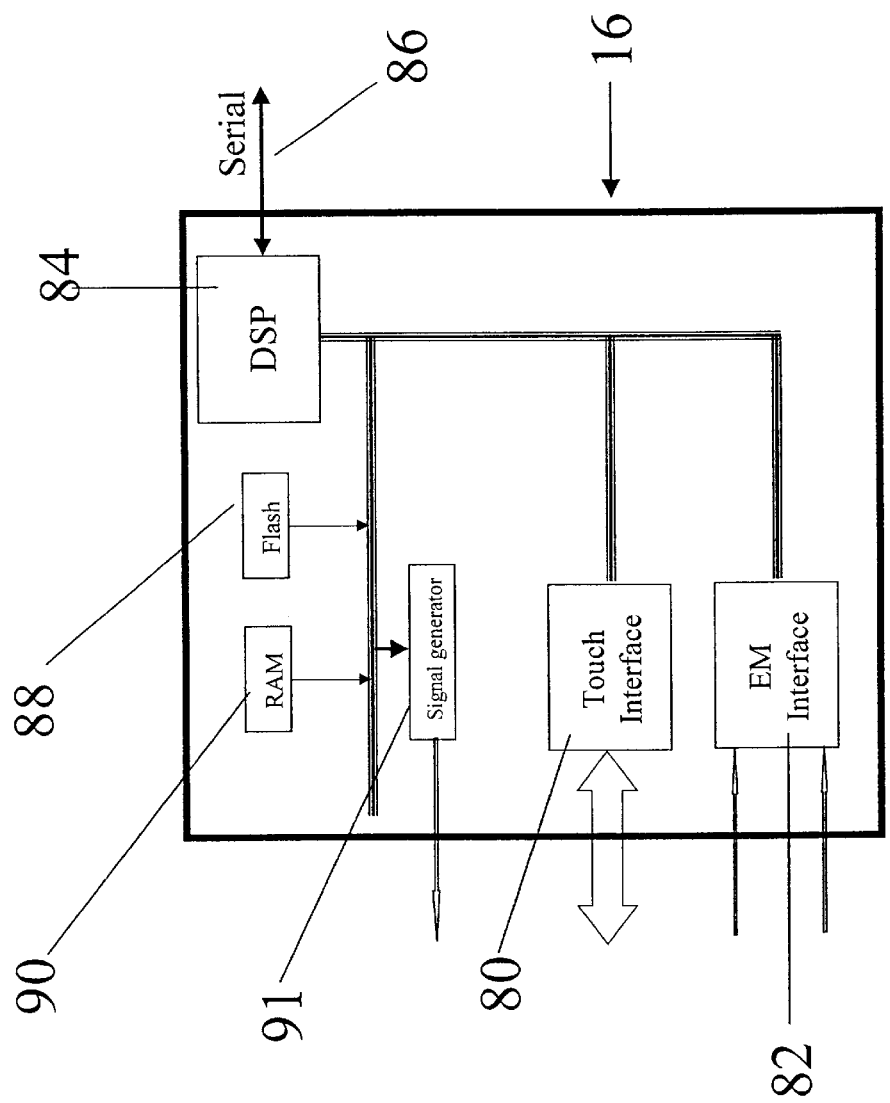
FIG. 7 is a simplified block diagram of a preferred embodiment of the digital processing unit of FIG. 1.
Figure 8:
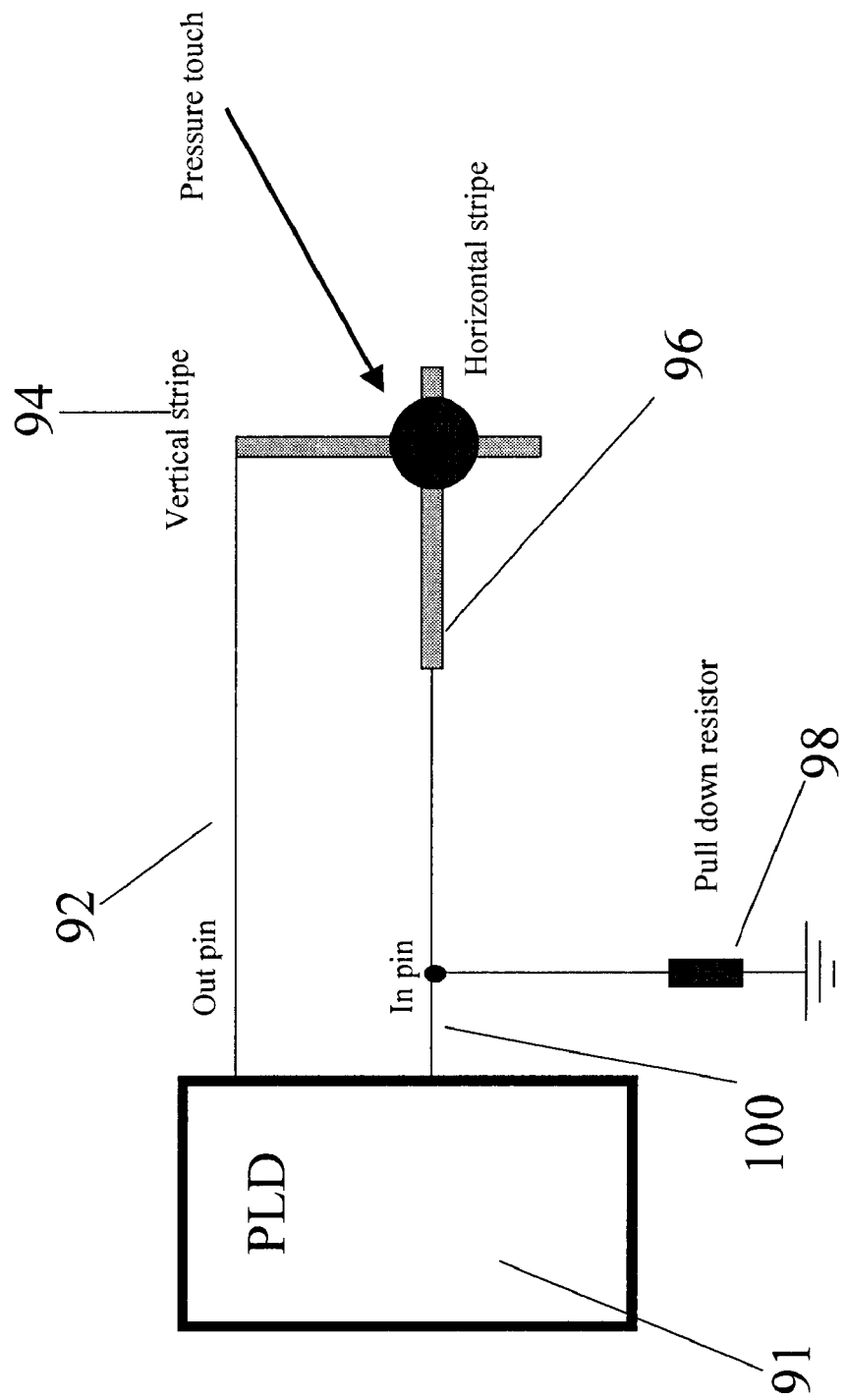
FIG. 8 is a simplified schematic diagram showing apparatus for detecting a single touch.

Reference is now made to FIG. 7, which is a simplified block diagram of a preferred embodiment of the digital processing unit 16 of FIG. 1. The digital processing unit 16 comprises two interfaces, a touch interface 80 and an EM interface 82. The touch interface 80 provides signals and receives inputs from the sensor touch conductors. The EM interface 82 operates in conjunction with the front end ASICs 14 which receive signals from the EM sensors. The EM interface receives serial inputs of the signals as sampled at the various front-ends 14 and packs them into a parallel representation. Digital signal processor (DSP) 84 is connected to both the touch and EM interfaces and processes data from the respective interfaces to determine the positions, both of physical objects such as styluses being detected by the EM subsystem and positions of finger touches being detected by the touch subsystem. The positions as calculated by the DSP are sent to the host computer via a link, for example a serial link 86. The DSP is preferably associated with a flash memory 88 and RAM 90. DSP operating code is preferably stored in the Flash memory 88 and sampled data is preferably stored in the RAM 90. Signal generator 91 provides trigger signals for the EM subsystem.

In a preferred embodiment, the touch interface 80 is implemented by a PLD (Programmable Logic Device). Each pressure stripe is directly connected to one of the PLD IO pins, which can be used both as an input and an output. Alternatively, bi-directional buffers may be located between the PLD and the sensor conductors, to amplify input and output signals.

Reference is now made to figure number 8, which is a simplified schematic diagram showing apparatus for detecting a single touch. A PLD 91, implementing the touch interface 80 as discussed above, outputs a signal, typically a static DC level, on one of its IO pins 92, which is used in this case as an output. The signal is provided to a vertical stripe 94. The vertical stripe 94 has a normally non-contact junction with horizontal stripe 96, which in turn is connected to a pull down resistor 98. As long as the vertical conductor 94 does not touch horizontal conductor 96, pull down resistor 98 forces the input voltage on PLD input pin 100, which is connected to horizontal conductor 96 to a low level. Finger pressure connects the vertical 94 and horizontal 96 stripes, causing the high voltage of the out pin 92 to be transferred to the in pin 100. The high level detected at the PLD input is interpreted as touch detection.

Preferably, DSP 84 controls the configuration and status of the IO pins of the PLD 91. The DSP 84 determines which of the pins currently provides an output or trigger signal and which is set for detecting input. That is to say it determines which of the I/O pins is set to '1' and which is set to '0' and it reads the level on the input pins. It should be noted that more than one output could be set to '1' at the same time, and likewise with '0'.

Figure 9:
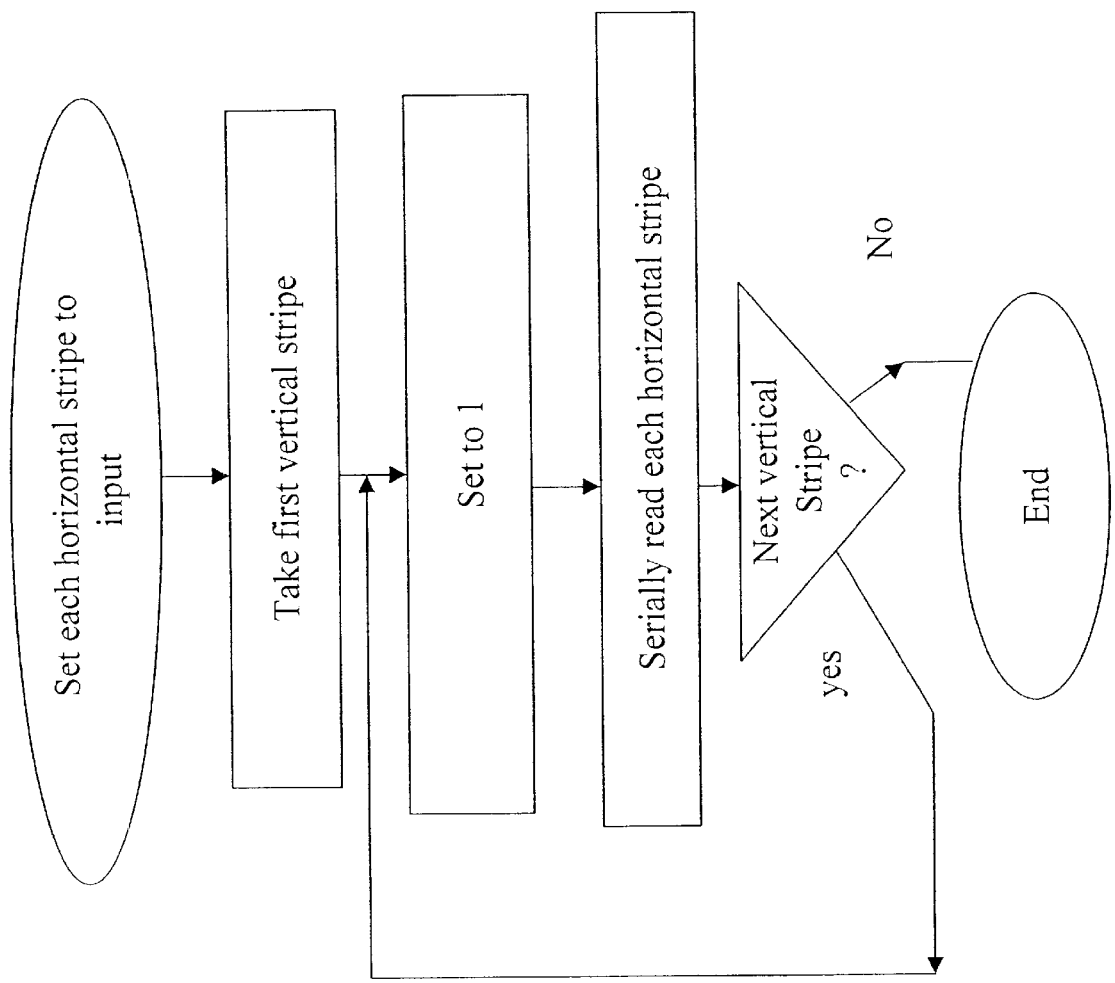
FIG. 9 is a simplified flow chart showing a first preferred embodiment of a procedure for detecting simultaneous multiple touches on a sensor.

Reference is now made to FIG. 9, which is a flow chart showing a first preferred embodiment of a procedure for cycling through the touch detectors in order to detect simultaneous multiple finger touches. In accordance with the procedure of FIG. 9, multiple touch detection is achieved by looping over each one of the pressure stripes in one of the grid axes, one stripe at a time, and reading, one after the other, the signal on each one of the grid stripes on the orthogonal axis.

In more detail, one of the axes, either vertical or horizontal, is selected for triggering and the other for reading. In the axis selected for reading, say the horizontal axis, each stripe is set to input, which in practice means a low state, typically by means of a pull down resistor as described above. Then the first of the stripes in the orthogonal axis, say the vertical axis, is set to one. Each of the horizontal stripes is now read. The presence of a one on any of the horizontal stripes indicates a finger at the junction between that horizontal stripe and the first vertical stripe. The process is repeated one by one for each of the vertical stripes until the entire screen has been scanned.

The cycle, in order to achieve reliable results, is preferably carried out at a rate that is at least as high as the highest rate that fingers are likely to type over the screen. The disadvantage of the procedure of FIG. 9 is the large number of detection steps. The procedure requires n*m steps, where n stands for the number of vertical stripes and m for the number of horizontal stripes, and it is hard to achieve the above described rate using such a procedure.

Figure 10:
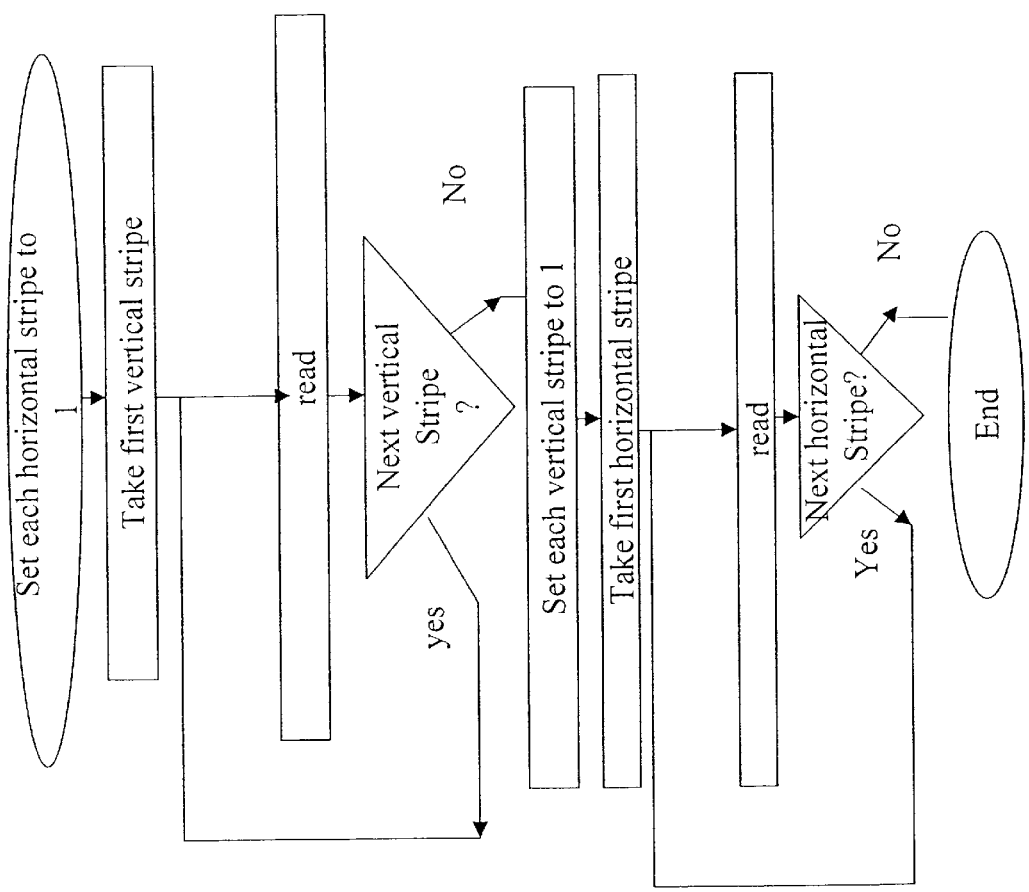
FIG. 10 is a simplified flow chart showing a second, more efficient, embodiment of a procedure for detecting simultaneous multiple touches on a sensor.

Reference is now made to FIG. 10, which is a simplified flow chart showing a faster procedure for detecting multiple touches. A signal, typically '1', is applied to a group of stripes on one axis. The group may typically be all of the stripes in that axis. Subsequently, inputs for each of the stripes on the other axis are read one after the other. Then, the same signal is applied to a group of stripes on the second axis, and readings are made at each one of the stripes on the first axis. If the groups used are the entire axis, then the procedure of FIG. 10 requires n+m steps, a considerable reduction on that of FIG. 9. However, the procedure is unable to distinguish between all possible touch combinations and is therefore only partly reliable. In particular, if two or more signal detections are present in each axis then ambiguity arises.

Figure 11:
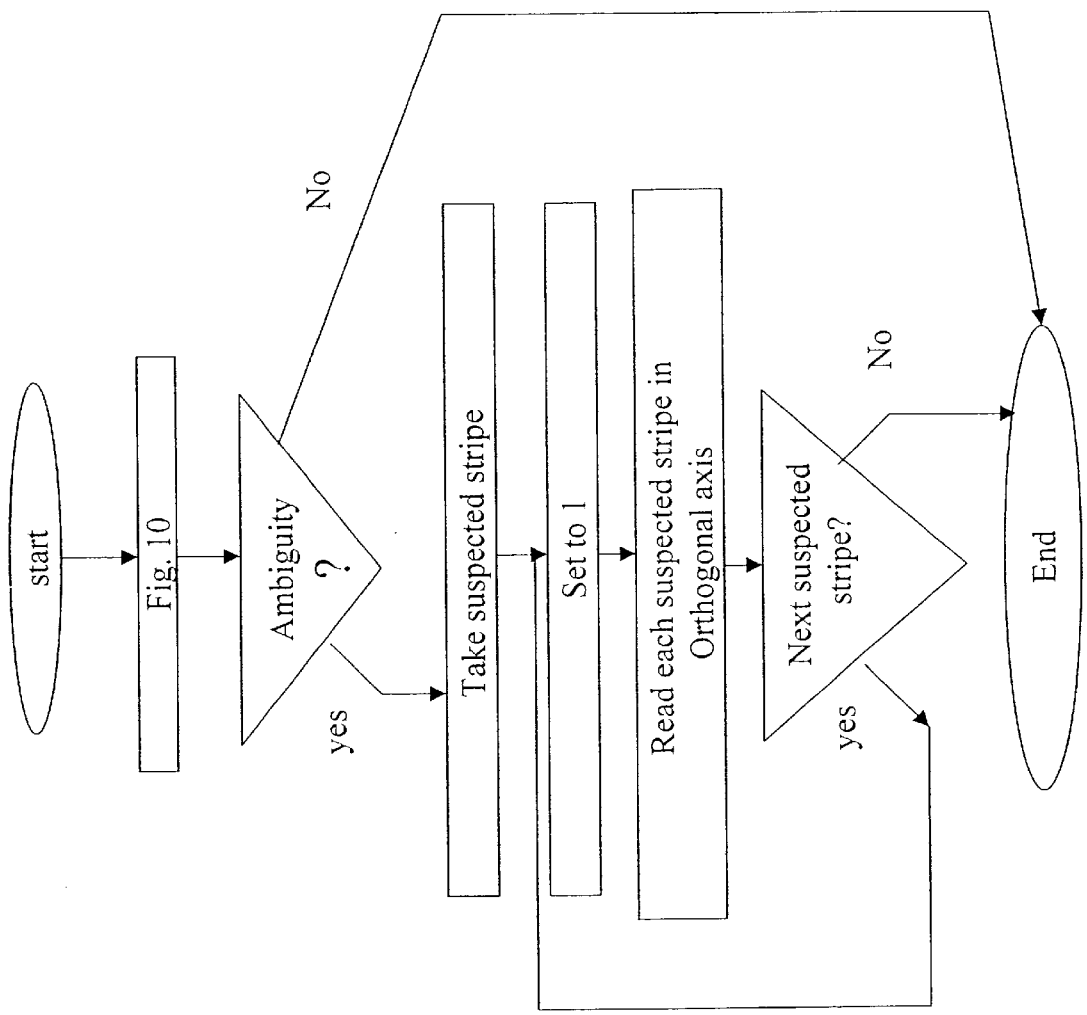
FIG. 11 is a simplified flow chart showing a third, more accurate, embodiment of a procedure for detecting simultaneous multiple touches on a sensor.

Reference is now made to FIG. 11, which is a simplified flow chart showing a third preferred embodiment of a procedure for detecting multiple touches.

In the embodiment of FIG. 11, both the procedures of FIGS. 9 and 10 are combined to produce a fully reliable detection algorithm. A first stage of the procedure of FIG. 11 is simply the carrying out of the procedure of FIG. 10. Namely a first signal is applied to all of the stripes in one axis and a response is looked for on the other axis. Then, a second signal is applied to all of the stripes on the other axis while looking for a response on the first axis.

The results of the procedure of FIG. 10 are used to determine whether an ambiguity exists and, if so, to decide which stripes can be considered as suspect stripes. An ambiguity is deemed to exist if both axes give more than one detection signal. A suspect stripe in such a case is any stripe which has given rise to a detection signal. In such a case the ambiguity is to be resolved. In order to achieve such a resolution, the algorithm loops over each of the suspected stripes in one of the axes, one after the other, and looks for a response on each one of the suspected stripes on the other axis. The procedure is thus able to provide unambiguous results at little cost to the processing time, since, unless an ambiguity is present, the number of steps remains at n+m. If an ambiguity is present then the number of additional steps that is added is simply the product of suspect stripes. In a preferred embodiment the axis selected for the loop is the axis with the smaller number of suspected stripes. Thus for p suspect stripes on the first axis and q suspect stripes on the second axis, the total number of steps is n+m+(q*p).

Additional objects, advantages, and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. Apparatus for user input to a digital system, comprising a first sensing system having first sensors for sensing a user interaction of a first kind using a sensing method of a first type, and a second sensing system having second sensors for sensing a user interaction of a second kind using a sensing method of a second type, said first and said second kind of interaction being mutually independent, and at least some of said first and at least some of said second sensors being patterned onto and co-located on a sensing layer of a first single foil in an interleaved manner.

2. Apparatus according to claim 1, wherein said co-located sensing systems are constructed as a foil-based sensing arrangement.

3. Apparatus according to claim 2, wherein said foil-based sensing arrangement further comprises at least a second patterned transparent foil having a second sensing surface comprising sensors of said first type co-located with sensors of said second type.

4. Apparatus according to claim 3, wherein at least some of said sensors comprise organic conductive material.

5. Apparatus according to claim 3, wherein said first single foil is a patterned transparent foil.

6. Apparatus according to claim 5, wherein said pattern is etched onto said foil, thereby to form said sensors of said first kind in co-location with said sensors of said second kind.

7. Apparatus according to claim 5, wherein said pattern is printed on said foil, thereby to form said sensors of said first kind in co-location with said sensors of said second kind.

8. Apparatus according to claim 5, wherein said pattern is introduced by passivation.

9. Apparatus according to claim 2, wherein said foil-based sensing arrangement comprises at least two superimposed transparent foils.

10. Apparatus according to claim 9, wherein sensors of said first sensing system are embedded in each of said at least two superimposed transparent foils.

11. Apparatus according to claim 10, wherein sensors of said second sensing system are embedded in each of said at least two superimposed transparent foils.

12. Apparatus according to claim 11, wherein sensors of said first and said second sensing systems are interleaved in said first of said at least two superimposed transparent foils.

13. Apparatus according to claim 9, wherein sensors of said second sensing system are embedded in each of said at least two superimposed transparent foils.

14. Apparatus according to claim 2, wherein sensors of said first and said second sensing systems respectively are interleaved in said foil-based sensing arrangement.

15. Apparatus according to claim 2, wherein each sensing system has a set of sensors located within said foil-based sensing arrangement, and wherein each set of sensors is arranged substantially as a grid.

* * * * *